(12) United States Patent
James et al.

(10) Patent No.: US 8,543,739 B2
(45) Date of Patent: Sep. 24, 2013

(54) DYNAMIC INTERPRETATION OF USER INPUT IN A PORTABLE ELECTRONIC DEVICE

(71) Applicant: Apple Inc., Cupertino, CA (US)

(72) Inventors: Bryan J. James, Menlo Park, CA (US); Jeffery T. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/753,296

(22) Filed: Jan. 29, 2013

(65) Prior Publication Data
US 2013/0141328 A1   Jun. 6, 2013

Related U.S. Application Data

(63) Continuation of application No. 12/623,154, filed on Nov. 20, 2009, now Pat. No. 8,364,855.

(51) Int. Cl.
*G06F 3/00* (2006.01)

(52) U.S. Cl.
USPC ................................................. 710/8; 710/16

(58) Field of Classification Search
USPC .................................................. 710/8, 15, 16
See application file for complete search history.

(56) References Cited

U.S. PATENT DOCUMENTS
2009/0011794 A1 *  1/2009  Seo ............................... 455/557

* cited by examiner

*Primary Examiner* — Ernest Unelus
(74) *Attorney, Agent, or Firm* — Dorsey & Whitney LLP

(57) ABSTRACT

The embodiments describe both the interpreting and modifying the interpretation of an input event to an electronic device having limited user input resources. The input event interpretation can be based in part on a connection state of the device. In some cases, the interpretation of the input event can also be based upon an indication of a current operating state of the device in addition to or exclusive of the connection state. Furthermore, in some embodiments, an operating state of the portable electronic device can be resolved based in part on the connection state of the portable electronic device.

20 Claims, 11 Drawing Sheets

| USER INPUT GESTURE | CONNECTION STATE (ANY PORT) | |
|---|---|---|
| | CONNECTION | NO CONNECTION |
| PRESS | SCREEN OFF | POWER OFF |
| PRESS + HOLD | MAIN MENU | POWER OFF |

DYNAMIC INTERPRETATION OF USER INPUT IN A PORTABLE ELECTRONIC DEVICE

This application is a continuation of U.S. patent application Ser. No. 12/623,154, entitled "Dynamic Interpretation of User Input in a Portable Electronic Device", filed on Nov. 20, 2009, which is incorporated by reference in its entirety as if fully disclosed herein.

TECHNICAL FIELD

The described embodiments relate to electronic devices. More particularly, techniques are described for providing control and navigation commands to a consumer electronic device having limited user input resources and computing resources.

BACKGROUND OF THE INVENTION

The proliferation of the physical size and storage capacity of portable electronic devices has encouraged innovation in user interface design practices. For example, a variety of input interfaces have been developed that can provide the user with a number of different mechanisms used to control the device operation or navigate the content stored therein. Within a family of devices that perform similar functions (such as a product line of portable media players) each family member can vary in size and storage capacity as well as the number and type of available user interfaces. For example different members of the iPod® family of portable media players manufactured by Apple Inc. of Cupertino Calif. can variously include a touch-screen, a click wheel, a physical button or any combination thereof. In some cases, however, a device may be so small that the device can only accommodate a limited user interface (such as a single physical button). However, even though the device itself may be small, the number and variety of content stored therein can be enormous. This large amount of stored content can require navigation techniques that cannot be easily implemented (if at all) by user inputs made available by the limited user interface found on these small form factor devices. In addition to providing a navigation tool, the limited user interface must also be able to provide the user with the ability to control the operation of the device thereby, greatly complicating the problem posed by the limited nature of the user input.

Thus, improved techniques for interpreting a user input by a small form factor electronic device having limited user input resources are desired.

SUMMARY OF THE DESCRIBED EMBODIMENTS

This paper describes various embodiments that relate to systems, methods, and apparatus for optimizing a user's interaction with a small form factor electronic device such as a portable media player. In the described embodiments, a user input can be dynamically interpreted based upon a connection state of the electronic device. In the case where the electronic device is connected to an external circuit, the user input event can be interpreted based upon both the connection state and a nature of the external circuit.

In one embodiment, a method of dynamically interpreting a user input at a user interface by a processor included in an electronic device is described. The method can be carried out by performing at least the following operations. A connection state of the electronic device is determined based upon whether or not the electronic device is connected to an external circuit. An indication of the user input event is received from the user input interface and interpreted in accordance with the connection state. The electronic device responds in accordance with the interpreted user input event. In the described embodiment, the interpretation of the user input event changes in accordance with a changed connection state of the electronic device.

In another embodiment a consumer electronic product is disclosed. The consumer electronic product includes at least a user interface configured to receive a user input event and a processor coupled to the user interface. In the described embodiment the processor receives an indication of the received user input event from the user interface, determines a first connection state of the consumer electronic product, and generates a first interpretation of the user input event in accordance with the first connection state of the electronic device. The processor then causes the consumer electronic product to respond in accordance with the first interpretation of the user input event. When the connection state changes from the first connection state to a second connection state, the processor interprets the user input event in accordance with the second connection state.

In still another embodiment, computer readable medium configured for storing computer code executed by a processor used for interpreting a user input event received at a user interface of an electronic device. The computer readable medium includes computer code for receiving an indication of the user input event from the user input interface, computer code for determining a connection state of the electronic device, computer code for interpreting a user input event consistent with the connection state such that when the connection state changes the interpretation of the user input event correspondingly changes, and computer code for causing the electronic device to respond in accordance with the interpreted user input event.

In yet another embodiment a method of dynamically interpreting a user input at a user interface by a processor included in the electronic device is described. The method can be can be carried out by performing at least the following operations. Determining a connection state of the electronic device based upon whether or not the electronic device is connected to an external circuit, receiving an indication of the user input event from the user input interface, setting an operating state of the electronic device based on the connection state, interpreting the user input event in accordance with the connection state and the operating state, and causing the electronic device to respond in accordance with the interpreted user input event. In the described embodiment, the interpretation of the user input event changes in accordance with a change in the connection state of electronic device or a change in the operating state.

BRIEF DESCRIPTION OF THE DRAWINGS

The invention and the advantages thereof may best be understood by reference to the following description taken in conjunction with the accompanying drawings.

FIGS. 7-9 shows representative user input event/connection state translation tables for a portable media player in accordance with the described embodiments.

DETAILED DESCRIPTION OF REPRESENTATIVE EMBODIMENTS

Figure 1:
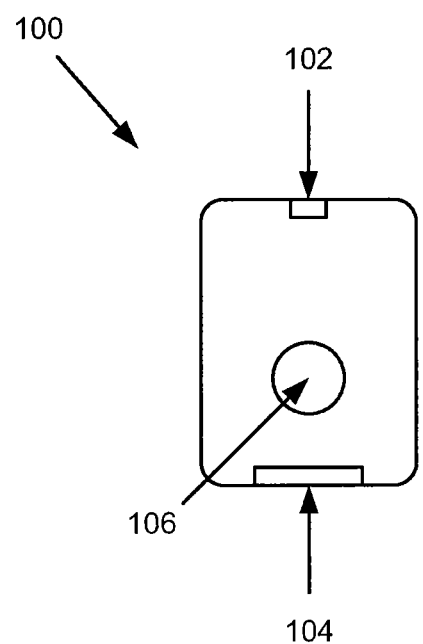
FIGS. 1-3 illustrate various embodiments of a portable electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The embodiments described herein relate to techniques well suited for small form factor devices having limited user input resources. In particular the embodiments describe both the interpreting and modifying the interpretation of an input event to an electronic device having limited user input resources. The input event interpretation can be based in part on a connection state of the device. In some cases, the interpretation of the input event can also be based upon an indication of a current operating state of the device in addition to or exclusive of the connection state. Furthermore, in some embodiments, an operating state of the portable electronic device can be resolved based in part on the connection state of the portable electronic device.

Electronic devices can take many forms. For example, a popular consumer electronic device known as a portable media player suitable for storing a large amount of digital content can be manufactured in a variety of shapes and sizes. However, some portable media players can be so small (having what can be referred to as a small form factor) that a user can only avail themselves of a user interface having a relatively small number of available user inputs or combinations thereof. This relatively small number of possible combinations can severely limit the ability of a user to control the device. Furthermore, the limited nature of the user input can severely restrict a user's ability to easily navigate stored content, in essence placing a substantial portion of the stored content effectively out of easy reach of the user. In order to solve this problem, conventional approaches to interacting with small form factor consumer electronic products include adding additional functionality by increasing the number of possible input commands for each available user input using special function inputs, special combinations of inputs, etc. Although this approach can increase the functionality provided by the limited user interface, in order to avail themselves of the increased functionality, the user must learn and remember a large number of input gestures which can be a daunting task at best.

In order to overcome the limitations of the prior art, a dynamic approach to interpreting user inputs is described. In one embodiment, a user input event at a portable electronic device can be interpreted based in part upon a connection state of the portable electronic device. The connection state can be, for example, whether or not a port(s) is connected or not connected to an external circuit and, in some cases, the nature (e.g., passive or active) of the external circuit. In this way, a user input event (such as a single button press or a button press and hold, for example) can be interpreted by the portable electronic device dynamically. By dynamically, it is meant that a response of the portable electronic device corresponding to a specific user input event can depend upon a current connection state of the portable electronic device. For example, if the current connection state is different from a previous connection state, then the response of the portable electronic device to the user input event can be different from the response of the portable electronic device in the previous connection state to the same user input event. Of course, if the current and the previous connection states remain the same, then with all else being equal, the responses can also be the same.

Furthermore, in some cases, an operating state of the portable electronic device can be resolved based solely upon a determination of the connection state of the portable electronic device. For example, if the connection state of a portable electronic device that has no other purpose than to output an audio signal by way of a head phone, for example, is determined to be not connected (i.e., there is no head phone connected to the portable electronic device), then it is a reasonable assumption that the portable electronic device is not being used or is not intended to be used. In this way, a connection state of "NOT CONNECTED", for example, can cause the portable electronic device to enter a default state of OFF or INACTIVE without requiring a user to provide a user input event at the user interface. Conversely, by connecting a headphone to the OFF (or INACTIVE) portable media player can cause the operating state of the portable media player to change to an ON state without requiring a user input event (such as a button press) at the user interface. Furthermore, in some embodiments discussed in more detail below, the type of circuit (passive or active) that is connected to the portable media player can have an effect on the state of the portable media player.

It should be noted that the term connection can describe a physical connection between the portable electronic device and a physical connector such as a cable, dongle, etc. However, the term connection can also refer to a wireless connection between the portable electronic device and an external circuit. In this way, the connection state of the portable electronic device can be updated by simply providing a wireless connection to the portable electronic device or removing the wireless connection to the portable electronic device. In some cases, a signal provided by the wireless connection can also be taken into consideration in determining either the connection state or the interpretation of the user input event.

These and other embodiments are discussed below with reference to FIGS. 1-11. However, those skilled in the art will readily appreciate that the detailed description given herein with respect to these figures is for explanatory purposes as the invention extends beyond these limited embodiments. In the following description, numerous specific details are set forth to provide a thorough understanding of the embodiments. It will be apparent, however, to one skilled in the art that the described embodiments may be practiced without some or all of these specific details.

Figure 2:
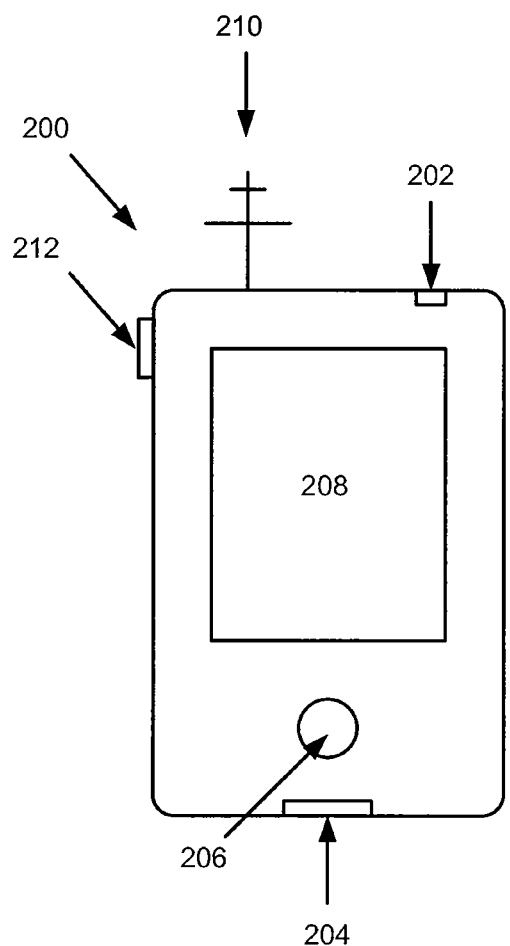
Figure 3:
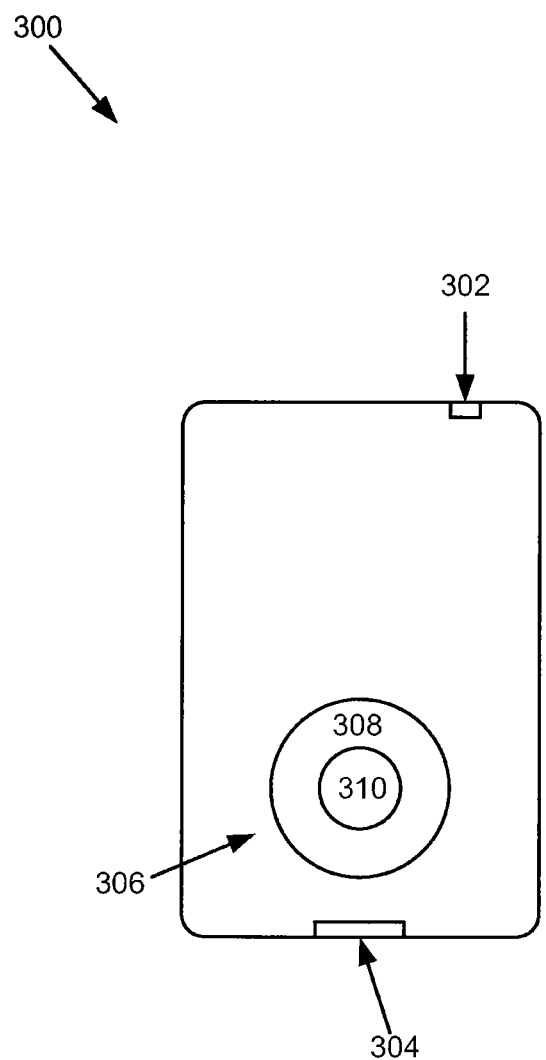

FIGS. 1-3 illustrate three representative portable electronic devices in accordance with the described embodiments. As shown in the accompanying drawings, each device can include at least a user input interface of one form or another and at least one connection port. The variation of user input interfaces can be based upon, for example, the intended use of the portable electronic device, the expected cost to manufacture, the expected retail market and demographics, and so on. For example, as shown in FIG. 1, portable electronic device 100 can represent a minimally configured portable electronic device. By minimally configured it is meant that device 100 does not include a display screen but does however include connection port 102, power port 104, and input interface 106. It should be noted that in some cases, device 100 can be strictly battery powered in which case there would be no need for power port 104. Since there is no display present, device 100 can be a relatively simple and easy to manufacture portable device well suited for those users who desire little more than the ability to store and access data. Such data can include, for example, media data in the form of digital audio files such as MP3 and so on that can be played (i.e., decoded) and output by device 100 at an output device (such as a headphone) at connection port 102.

In one embodiment, interface 106 can take the form of depressible button 106 that can respond to a user applying pressure to it by generating a click or other appropriate response. In other embodiments, interface 106 can take the form of a dial that can respond to a user applying a rotational force. In still other embodiments such as that illustrated in FIG. 3, interface 106 can be multiply configured to respond to an appropriate user input event as both a dial and a depressible button. In still other cases, interface 106 can be touch sensitive that can respond to a user's touch as in a touch pad. However, due to the physical limitations of interface 106, the user can interact with the device 100 using only a limited number of different physical gestures. For example a user can provide a user input event in the form of a single tap, a double tap, or a press and hold gesture each of which be interpreted as a different input command. For example, in some cases, the single tap on the button 106 can lock device 100, while the press and hold gesture can cause device 100 to present audible main menu listing by the output device connected at port 102.

FIG. 2 shows portable electronic device 200 in accordance with the described embodiments. As compared to device 100 illustrated in FIG. 1, device 200 represents a somewhat more complexly configured portable electronic device than that represented by device 100. Much like device 100, device 200 can include connection port 202, power port 204, and user interface 206. However, device 200 can also include additional output devices such as display 208. In some cases, display 208 can include a touch sensitive layer rendering display 208 sensitive to a user's touch. In this way, display 208 can provide a wide variety of touch based input commands to portable electronic device 200 based upon specific gestures created by one or more of the user's fingers used singly or in any combination. However, for the remainder of this discussion, display 208 is not considered to be touch sensitive and can therefore only be used to display suitable visual content. Device 200 can include in addition to connection port 202, connection port 210 specifically configured to enable a wireless connection between device 200 and an external circuit such as another portable electronic device or as part of a wireless network.

Device 200 can also include switch input interface 212 that can in some cases be "hardwired" to perform a particular task. It should be noted that by hardwired it is meant that interface 212 has been configured (by way of internal circuitry or firmware) to respond to a specific external stimulus (such as a finger press, voice command, etc.) in a specific way. For example, as a hold switch, switch input interface 212 can lock out user interface 206 by preventing user interface 206 from acting on a received user input event. This can be a useful feature for portable devices that are carried about or placed in a user's pocket where an inadvertent press event can unintentionally change a status of portable electronic device 200. Other uses for switch input interface 212 can include acting as a power switch where the user can affirmatively turn portable electronic device 200 on or off, or as a mute switch enabling or disabling audio output circuitry. In any case, switch input interface 212 provides yet another mechanism that can be used for interpreting a user input event at interface 206.

FIG. 3 shows portable electronic device 300 in accordance with the described embodiments. Portable electronic device 300 can include connection port 302 and power port 304. In this embodiment, however, portable electronic device 300 can include multiply configured user interface 306 capable of responding to a number of different user input event types in a unified manner. For example, outer portion 308 can respond to rotational movements in either a clockwise or counter-clockwise direction of a user's finger along the lines of turning a dial or knob. In some cases, outer portion 308 can respond to a user's touch while in other cases, outer portion 308 can include tactile sensors that can provide a signal by deforming in response to a user applying pressure to outer portion 308. Moreover, center portion 310 can respond along the lines of a depressible button (such as button 106). In this way, multiply configured user interface 306 can provide a richer user experience than is possible with a more simple interface such as button 106.

Even though each of the devices 100, 200, and 300 are superficially similar in appearance, each can be configured very differently for very different consumers. For example, minimally configured electronic device 100 can be specifically tailored to provide a satisfactory user experience for those consumers interested in a potentially inexpensive and easy to use portable media player. However, just by virtue of the fact that device 100 may be relatively inexpensive, a typical consumer expects that device 100 is easy to use and does not require extensive memorization on the part of the user to fully enjoy device 100. For example, in the case where device 100 takes the form of portable media player 100 having the potential for storing a large amount of digital data, the user must be able to quickly and easily generate basic operating commands (such as turn power on, turn power off, select, play, stop, and so on). In addition, the user must be able to easily navigate the stored data in order to find a particular item of digital content in the form of, for example, a desired song, music or other data. Given the small number and types of user inputs that can be accommodated by interface 106, providing the user of device 100 with a comprehensive and easy to use set of user commands can be difficult using conventional approaches that rely on a static interpretation of user input types.

Therefore using the techniques of dynamic interpretation of user input types taught by the described embodiments provides an easy to use and robust system well suited for portable media players having limited user input resources. By dynamic interpretation it is meant that a particular user input event (such as a finger press) can be interpreted in more than one way based upon any number of extrinsic properties of the portable media player. Such extrinsic properties can include, for example, a connection state of the portable media player (connected or not connected), a current operating state of the portable media player, the type (passive or active) of circuit to which the portable media player is connected, or any combination thereof. In this way, the physical limitations of the user interface can be substantially overcome to provide the user with a much wider choice of commands than would otherwise be possible using conventional static interpretation protocols.

Figure 4:
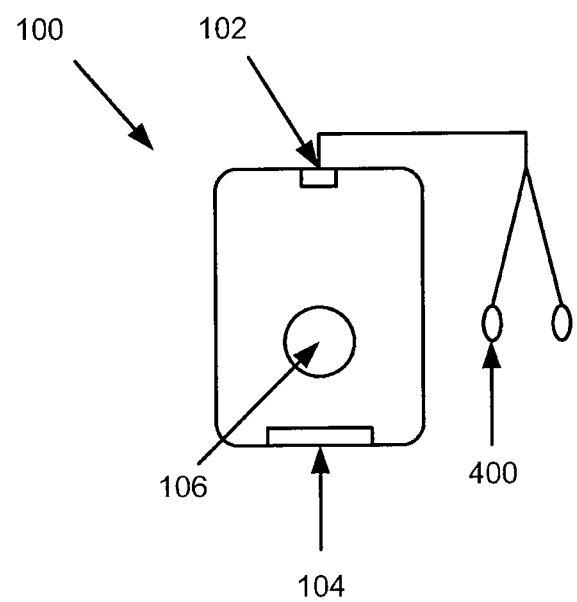
FIGS. 4-6 illustrate various connection states of an electronic device in accordance with the described embodiments.
Figure 5:
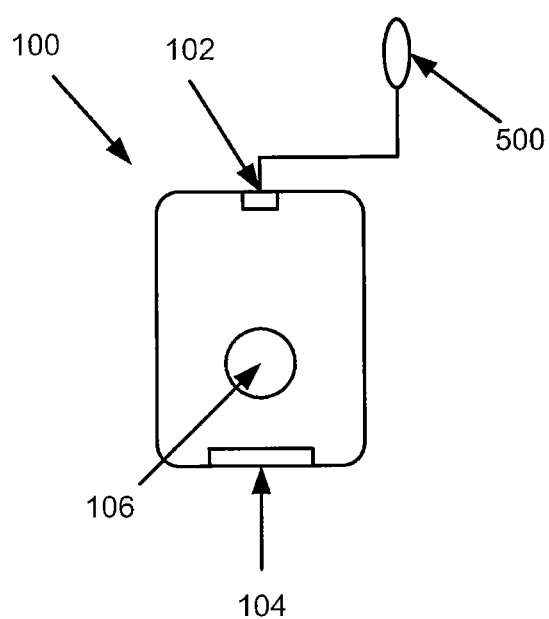
Figure 6:
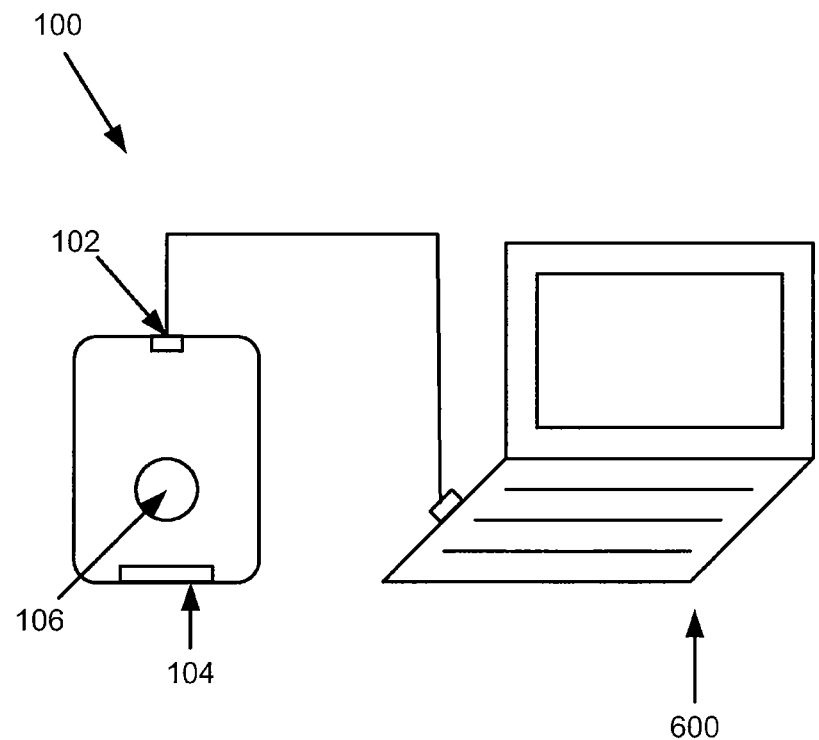

FIGS. 4-6 illustrate various configurations of portable media player 100 in accordance with the described embodiments. As discussed above, portable media player 100 is minimally configured to include connection port 102, (optional) power port 104, and input interface 106 arranged to receive a user input. In accordance with the described embodiment, portable media player 100 can interpret the user input received at user interface 106 based upon at least a connection status of portable media player 100. By connection status it is meant whether or not an external device is electrically connected to connection port 102. In some embodiments, a further determination can be made if the external circuit is a passive external circuit or an active external circuit. A passive external circuit can be one that relies upon processing resources and/or circuitry included in portable media player 100 to function as required. Examples of passive external circuits can include, for example, a head phone, an ear bud, a speaker, etc. On the other hand, an active external circuit can include processing resources or circuits that do not rely upon those in portable media player 100 to operate. Examples of active external circuits can include, for example, a computer, a media reproduction accessory device, and so on.

FIG. 4 shows portable media player 100 connected to an external passive circuit 400 in accordance with the described embodiments. In this example, external passive circuit 400 can take the form of a pair of headphones, ear buds, external speaker, etc. well suited to receive an audio signal by way of connection port 102. In this case, an affirmative connection at connection port 102 can cause (without user intervention) the operating state of portable media player 100 to be ACTIVE and the mode of connection port 102 to be TRANSMIT. Taking this into consideration, a processor included in portable media player 100 can interpret an input event received at user interface 106 in a manner consistent with the {ACTIVE, TRANSMIT} state of portable media player 100. For example, if a user input event in the form of a press and hold is received at user interface 106, the processor can cause portable media player 100 change a song being played (if a song is currently being played), stop the currently playing song, and so on. Moreover, if the user decides to disconnect external passive circuit 400 from portable media player 100 then without further ado (i.e., without a user input) the processor can force portable media player 100 into the INACTIVE state and connection 102 in a disable mode. In some cases, with portable media player 100 INACTIVE, the currently playing song or music can be paused only to restart with the connection to the external circuit is re-established and portable media player 100 is again ACTIVE (presuming of course that the external circuit is analogous to external circuit 400). Therefore, merely changing the connection state of portable media player 100 can substantially change the interaction between portable media player 100 and a user as well as the basic operation of portable media player 106 itself.

FIG. 5 shows external passive circuit 500 connected to port 102 in accordance with another embodiment. In this situation, however, external passive circuit 500, instead of receiving data (such as audio) from portable media player 100, can send data to portable media player 100. An example of such a circuit is a microphone arranged to send audio data (or at least data that can be processed into audio data) from the external environment to portable media player 100 for processing. Such processing can include, for example, generating voice memos, recording music, songs, and so on for storage on portable media player 100. In this way, a processor can automatically set an operating state of portable media player 100 without user intervention by simply determining if an external circuit is connected (or not), the type of external circuit (passive or active), and in some cases, the nature of the external circuit (data transmitter or data receiver). In this way, for example, when the processor determines that microphone 500 is connected to portable media player 100, then the processor can set portable media player to ACTIVE state and connection port 102 to RECEIVE mode. Therefore, merely changing the type of external passive circuit connected to connection port 102 can have the effect of automatically changing a fundamental operating characteristic (i.e., TRANSMIT to RECEIVE) of portable media player 100 without requiring any user action other than changing the external circuit (which was going to happen in any case).

Furthermore, the interpretation of a user input event received at user interface 106 can be modified to be consistent with the current operating state of portable media player 106. For example, with microphone 500 connected to portable media player 100, the user input event in the form of the touch and hold gesture can be interpreted in a manner consistent with the current operating state of portable media player 100, namely {ACTIVE, RECEIVE}. One such interpretation can be pause recording as opposed to pause playing when headphones 400 is connected to connection port 102. In this way, by being able to dynamically interpret the same user input event based at least upon a connection status and/or an operating status can greatly reduce the number of gestures required to control as well as navigate content stored on portable media player 100.

FIG. 6 shows yet another embodiment showing portable media player 100 connected to active external circuit 600. In this example, active external circuit 600 can take the form of computer 600 having storage medium and processing resources independent of portable media player 100. This situation is typical for synchronizing digital content between both computer 600 and portable media player 100. In this case, after either the processor in portable media player 100 or in computer 600 determines that the connected external device is computer 600, either computer 600 or portable media player 100 can determine if a synchronization between the two systems can be carried out. If the synchronization is to be carried out, then the processor in the portable media player 100 can set connection port 102 to RECEIVE (if updated media files are going to be received from computer 600) and update the interpretation of the user input event received at user interface 106. Using the example of the press and hold gesture, the processor can interpret the press and hold gesture at user interface 106 in a manner consistent with the synchronization procedure being carried out between computer 600 and portable media player 100. This interpretation can be, for example, pause the synchronization until the hold is released, or any other appropriate response.

FIG. 7 shows representative user input event/connection state translation table 700 for portable media player 100 in accordance with the described embodiments. For example, if connection port 102 is connected to an external circuit, then the corresponding connection state is CONNECTION. In this case, portable media player 100 can respond to a "press and hold" input gesture by, for example, returning to a main menu whereas a single input gesture (i.e., no hold portion) can cause portable media device 100 to respond by pausing or playing depending, of course, on the nature of the external circuit connected to connection port 102. On the other hand, if there is no external circuit connected to connection port 102, then the operating state of portable media player 100 can be set to INACTIVE or OFF.

Figure 8:

FIG. 8 shows representative user input event/connection state translation table 800 for portable media player 100 in accordance with the described embodiments. In this case, translation table 800 takes into consideration the nature of the external device connected to connection port 102. For example, if the external device can send data to portable media player 100 (such as a microphone), then the press and hold gesture can be interpreted to cause portable media player 100 to turn on or off whereas the press and hold gesture can cause portable media player 100 to record or pause. If, on the other hand, the external device can be characterized as receiving data from portable media player 100, such as headphone 400, then the press gesture can be interpreted in such a way as to cause portable media player 100 to play or pause whereas the press and hold gesture can cause portable media player 100 to turn on or off.

Figure 9:
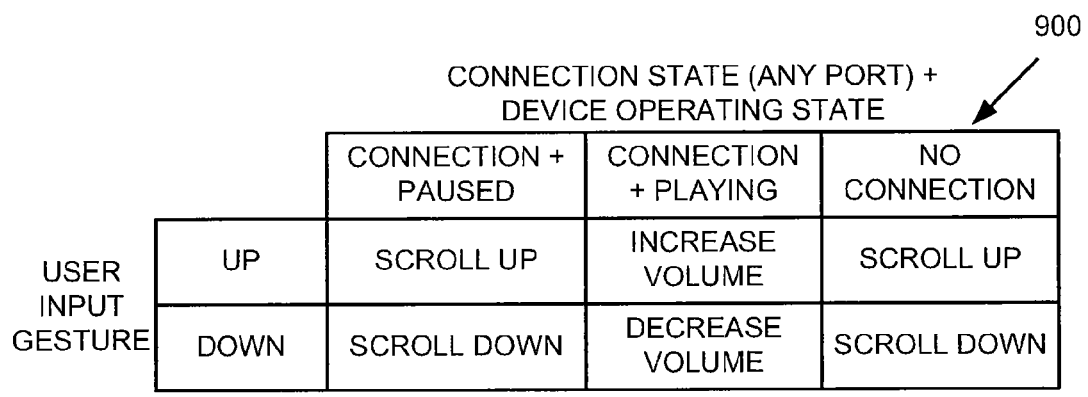

FIG. 9 shows representative user input event/connection state translation table 900 for portable media player 100 in accordance with the described embodiments. In this case, translation table 900 takes into consideration the nature of the external device connected to connection port 102 as well as the current operating state of portable media player 100. In this example, if portable media player 100 is connected to an external circuit, then a user input gesture of UP can be interpreted differently depending upon the current operating state of portable media player 100. For example, if the current operating state is PAUSED, then an UP user input gesture can be interpreted in such a way to cause portable media player 100 to SCROLL UP (if a display is present such as with devices 200 and 300). On the other hand, if the current operating state is PLAYING, then the same UP user input gesture can be interpreted in such a way as to cause portable media player 100 to INCREASE VOLUME.

Figure 10:
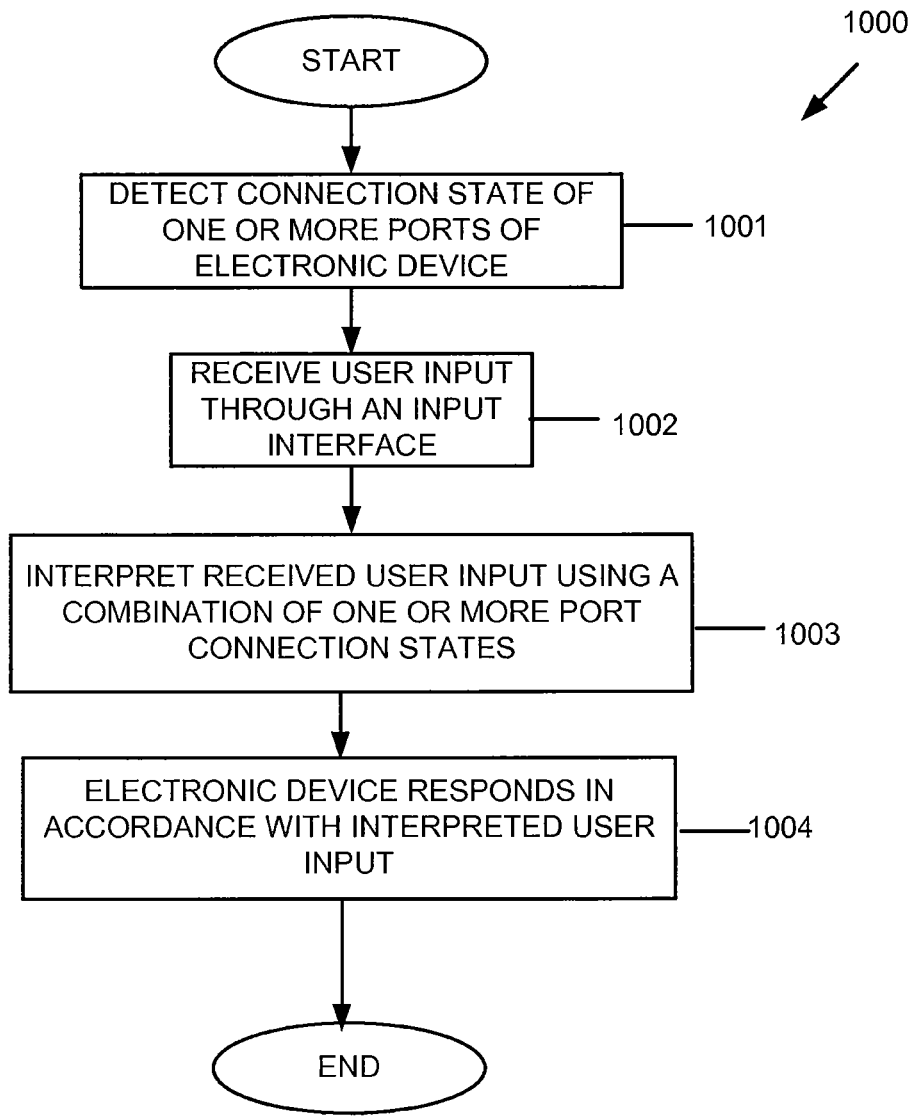
FIG. 10 illustrates a flow chart of an illustrative method for interpreting a user input based on a connection state and operating state.

FIG. 10 illustrates a flowchart 1000 for a method to modify a user input based on the connection states of an electronic device. In step 1001, a connection state of each of one or more ports of the electronic device can be detected. In step 1002, a user input at the electronic device can be received through an input interface of the device. In step 1003, the received user input can be interpreted using a combination of the connection states of the one or more ports of the electronic device. In step 1004, the electronic device responds in accordance with the interpreted user input.

Figure 11:
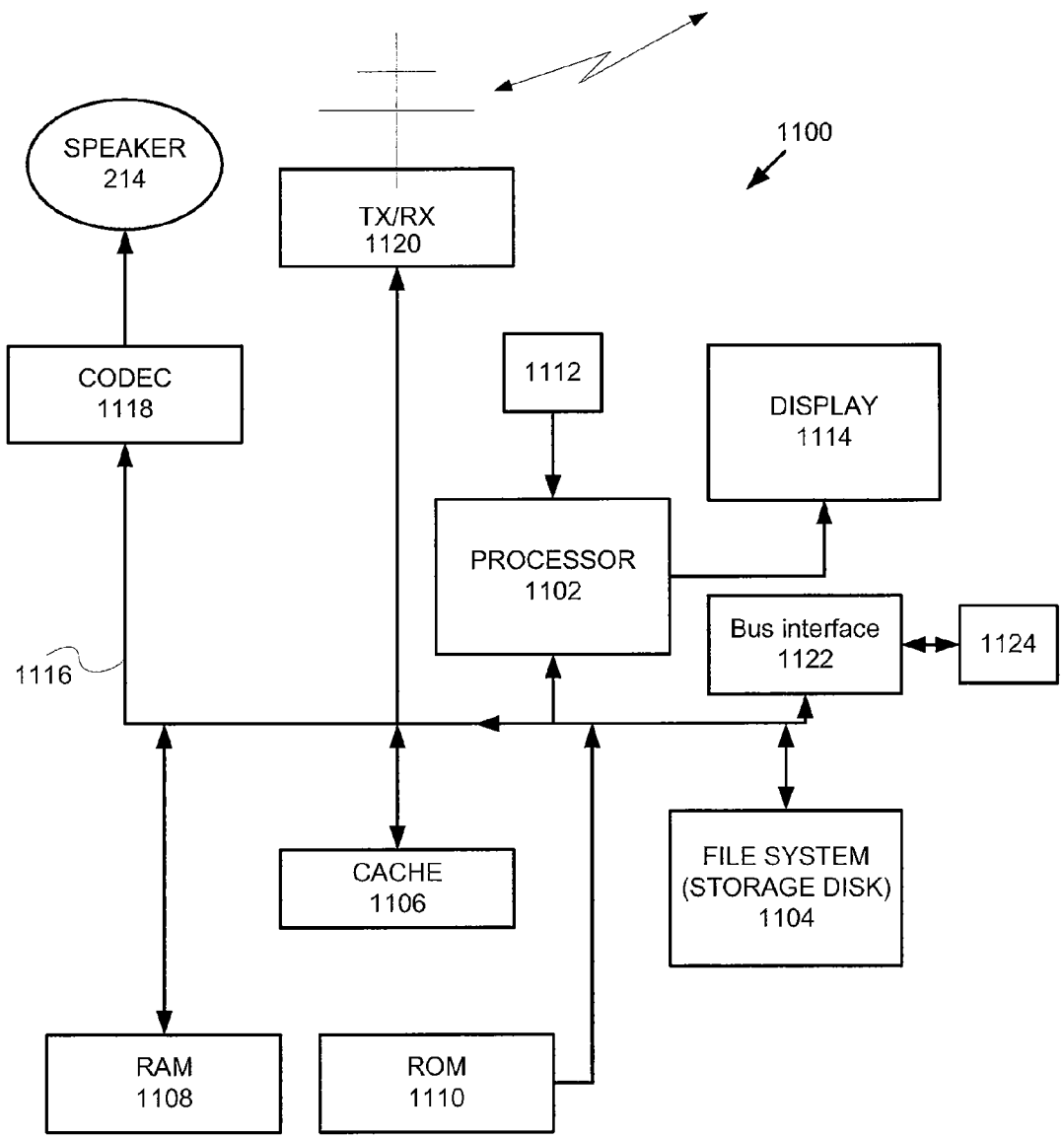
FIG. 11 illustrates a representative portable media player in accordance with the described embodiments.

FIG. 11 shows representative portable multimedia player 1100 in accordance with an embodiment of the invention. Media player 1100 can include processor 1102 that pertains to a microprocessor or controller for controlling the overall operation of media player 1100. Media player 1100 can store media data pertaining to media files in file system 1104 and cache 1106. File system 1104 typically provides high capacity storage capability for media player 1100. However, since the access time to file system 1104 is relatively slow, media player 1100 can also include a cache 1106. Cache 1106 is, for example, Random-Access Memory (RAM) provided by semiconductor memory. The relative access time to the cache 1106 is substantially shorter than for file system 1104. However, cache 1106 does not have the large storage capacity of file system 1104. Further, file system 1104, when active, consumes more power than does cache 1106. The power consumption is particularly important when media player 1100 is a portable media player that is powered by a battery (not shown). Media player 1100 also includes RAM 1108 for providing volatile data storage and a Read-Only Memory (ROM) 1110 arranged to store programs, utilities or processes to be executed in a non-volatile manner.

Media player 1100 also includes user input device 1112 that allows a user of media player 1100 to program any individual (or combination) interaction with media player 1100. In some embodiments, media player 1100 can include display 1114 that can be controlled by processor 1102 to display information to the user. Data bus 1116 can facilitate data transfer between at least file system 1104, the cache 1106, processor 1102, CODEC 1118 and wireless interface 1120. Bus interface 1122 can couple to data link 1124 that allows media player 1100 to couple to a host computer.

Media player 1100 can take the form of a portable computing device dedicated to processing media such as audio. For example, media player 1100 can be a music player (e.g., MP3 player), a game player, and the like. These devices are generally battery operated and highly portable so as to allow a user to listen to music, play games or video, record video or take pictures wherever the user travels. In one implementation, media player 1100 is a handheld device that is sized for placement into a pocket or hand of the user. By being handheld, media player 1100 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the users hands, no reference surface such as a desktop is needed.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the described embodiments be defined by the following claims and their equivalents.

What is claimed is:

1. A method of dynamically interpreting a user input event of an electronic device, comprising:
    by a processor in the electronic device;
    determining the connection state of the at least two ports of the electronic device with an external circuit, the connection state of the at least two ports having at least two distinct values;
    determining from a plurality of external circuit types the type of external circuit connected to the at least two ports;
    receiving the user input event through at least a first input interface;
    associating the user input event with a specific device response selected from a plurality of specific device responses based on the determined connection states of the at least two ports and the determined external circuit types of the circuits connected to the at least two ports; wherein a first specific response to the user input event varies based on the determined connection state and the determined type of the external circuit; and causing the electronic device to act in accordance with the selected specific device response.

2. The method of claim 1, further comprising setting an operation state of the electronic device to an inactive state when all determined connection states are determined to be a null connection state.

3. The method of claim 1, wherein the user input event is a button press and hold, and in response to the user input event, the method further comprising: causing the electronic device to display a menu when determined a connection exists to between any port of the electronic device and an external circuit; and causing the electronic device to power off when the determined connection state of all ports of the electronic device are determine to be a null connection state.

4. The method of claim 1, wherein the determined circuit type of the external circuit is a passive external circuit or an active external circuit.

5. The method of claim 4, wherein the passive external circuit is a headphone and the active external circuit is a computer.

6. The method of claim 1, wherein the plurality of external circuit types includes at least an input device configured to transmit signals to the electronic device.

7. The method of claim 1, wherein the plurality of external circuit types includes at least an output device configured to receive signals from the electronic device.

8. The method of claim 7, wherein the plurality of specific device responses includes at least one response to modify the signals sent to the output device.

9. An electronic device comprising:
a user interface configured to receive a user input event;
a processor coupled to the user interface; and
at least two ports configured to connect to at least a first and second external circuit, the at the at least two ports coupled to the processor;
wherein the processor is configured to:
determine the connection state of at least two ports of the electronic device with an external circuit;
determine from a plurality of external circuit types the type of external circuit connected to the at least two ports;
associate the user input event with a specific device response selected from a plurality of device responses based on the determined connection states of the at least two ports and the determined external circuit types of the circuits connected to the at least two ports; wherein a first specific response to the user input event varies based on the determined connection state and the determined type of the external circuit; and cause the electronic device to act in accordance with the selected specific device response.

10. The device of claim 9, wherein the user input event is a button press and hold, and in response to the user input event, the processor further configured to: cause the electronic device to display a menu when determined a connection exists to between any port of the electronic device and an external circuit; and cause the electronic device to power off when the determined connection state of all ports of the electronic device are determine to be a null connection state.

11. The device of claim 9, wherein the determined circuit type of the external circuit is a passive external circuit or an active external circuit.

12. The device of claim 11, wherein the passive external circuit is a headphone and the active external circuit is a computer.

13. The device of claim 6, wherein the electronic device is a portable media player.

14. A non-transitory computer readable medium storing computer code executed by a processor of an electronic device, the non-transitory computer readable medium comprising:
computer code for receiving a user input event from at least a first input interface coupled to the processor;
computer code for determining the connection state of at least two ports of the electronic device with an external circuit, the connection state having at least two distinct values;
computer code for determining from a plurality of external circuit types the type of external circuit connected the at least two parts of the electronic device;
computer code for associating the user input event with a specific device response selected from a plurality of specific device responses based on the determined connection states of at least two ports and the determined external circuit types of the circuits connected to the at least two ports; wherein a first specific response to the user input event varies based on the determined connection state and the determined type of the external circuit; and
computer code for causing the electronic device to act in accordance with the selected specific device response.

15. The non-transitory computer readable medium of claim 14, further comprising computer code for setting an operation state of the electronic device based on the connection states and external circuit types of the at least two ports of the electronic device.

16. The non-transitory computer readable medium of claim 15, wherein when the determined connection state of all ports of the electronic device is a null connection state, the operating state of the electronic device is set to a default state.

17. The non-transitory computer readable medium of claim 16, wherein the default state of the electronic device is an inactive state.

18. The non-transitory computer readable medium of claim 14, wherein the plurality of external circuit types includes at least an external input circuit configured to transmit signals to the electronic device.

19. The non-transitory computer readable medium of claim 14, wherein the plurality of external circuit types includes at least an external output circuit configured to receive signals from the electronic device.

20. The non-transitory computer readable medium of claim 19, wherein the plurality of specific device responses includes at least one response to modify the signals sent to the external output circuit.

* * * * *